V. P. McVOY.
GREASE CUP ATTACHMENT.
APPLICATION FILED NOV. 20, 1919.
1,357,885.
Patented Nov. 2, 1920.
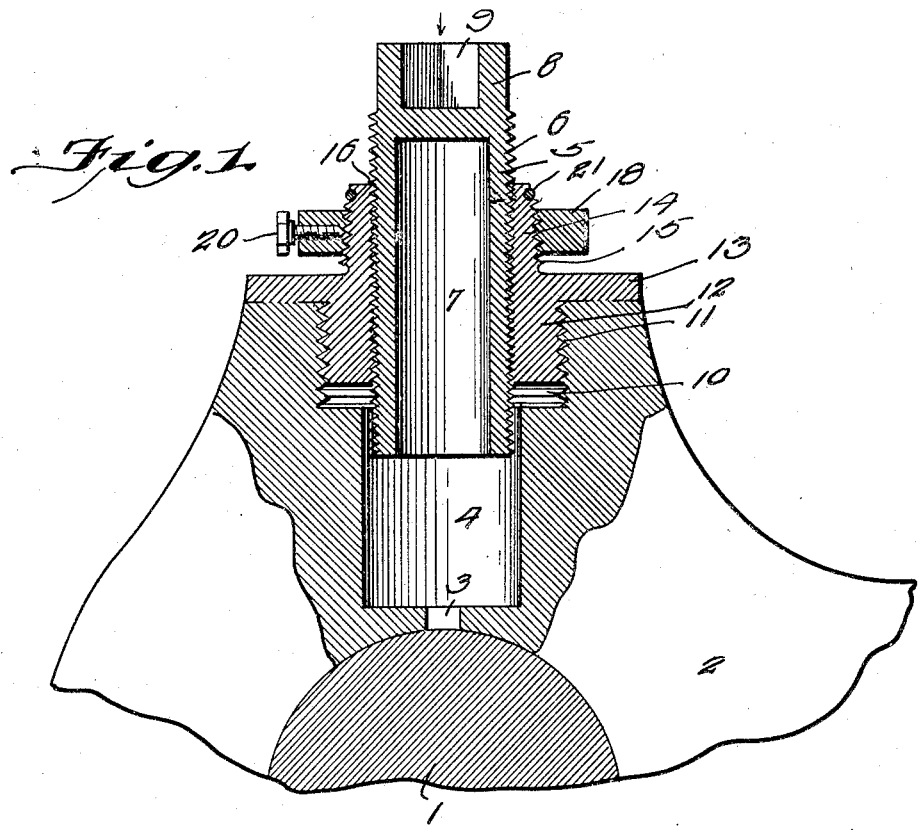
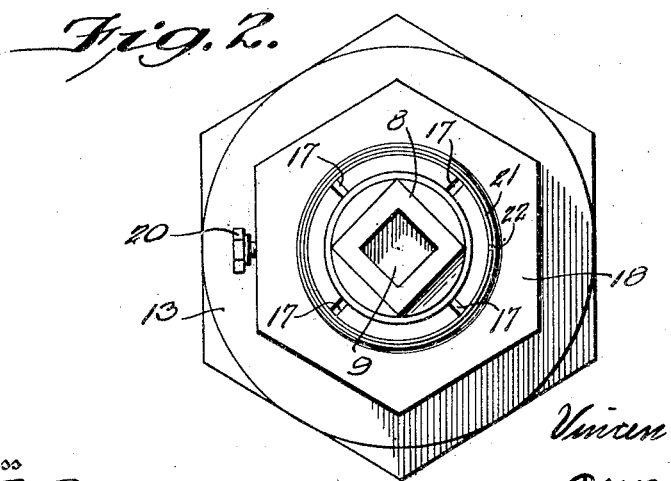
Inventor
Vincent P. McVoy
By E. K. Bond
Attorney
Witness

UNITED STATES PATENT OFFICE.

VINCEN P. McVOY, OF MOBILE, ALABAMA, ASSIGNOR TO UNITED STATES RAILWAY SUPPLY COMPANY, OF DOVER, DELAWARE, A CORPORATION OF DELAWARE.

GREASE-CUP ATTACHMENT.

1,357,885.      Specification of Letters Patent.      Patented Nov. 2, 1920.

Application filed November 20, 1919. Serial No. 339,522.

*To all whom it may concern:*

Be it known that I, VINCEN P. McVOY, a citizen of the United States, residing at Mobile, in the county of Mobile and State of Alabama, have invented certain new and useful Improvements in Grease-Cup Attachments, of which the following is a specification.

This invention relates to certain new and useful improvements in grease cup plugs of that type designed for use upon side-rods of a locomotive, although, of course, it is not restricted to such use.

Great trouble has been experienced in the past by reason of the plugs becoming loose, due to vibration, and lost, and it is the primary object of the present invention to provide simple, yet efficient, durable and reliable means for preventing such loss of the plug.

Other objects and advantages of the invention will hereinafter appear and the novel features thereof will be particularly pointed out in the appended claims.

The invention, in its preferred form, is clearly illustrated in the accompanying drawings, which, with the numerals of reference indicated thereon, form a part of this specification, and in which—

Figure 1 is a longitudinal section, with portions broken away, showing the application of my present improvement.

Fig. 2 is an end view, looking in the direction of the arrow in Fig. 1.

Like numerals of reference indicate like parts throughout the different views.

Referring to the drawing, 1 designates the crank pin and 2 a portion of the side or main rod of a locomotive, these parts being of the ordinary construction except as hereinafter specified.

3 is the oil opening from the grease chamber 4.

5 is the plug externally threaded, as at 6, and counterbored or chambered, as at 7. Its outer end is shown as made polygonal in form, as at 8, for the reception of a wrench and is also provided with a socket, as at 9, so as to permit the use of a socket wrench, if preferred.

The side rod 2 is further chambered, as at 10, the walls thereof being screw-threaded, as at 11, to receive the screw-threaded portion 12 of a bushing having a flange 13 engaging the outer face of the adjacent portion of the side rod 2. This bushing is provided with an extension 14 which is tapered, as seen in Fig. 1, is exteriorly threaded, as seen at 15, and interiorly threaded, as seen at 16. The interior threads engage the exterior threads 6 of the plug, as shown.

This tapered portion 14 is longitudinally slit, as seen at 17 in Fig. 2, and engageable therewith is the nut 18 which is interiorly threaded, as seen at 19, the threaded bore or aperture thereof being tapered to conform to the taper of the portion 14.

In practice, the bushing is threaded into the side rod, the plug is threaded into the bushing and the nut is then applied to the tapered portion 14 and screwed up until proper tension is put upon the split portions of the member 14 to firmly and securely hold the plug in position.

As a further safeguard, I provide the screw 20, which may be in the nature of a set screw adapted to be operated by a wrench, or otherwise, which screw is threaded through the nut 18 and adapted to engage the threads of the tapered portion 14 as seen best in Fig. 1.

As a means to guard against loss of the nut 18 should it, perchance, come loose or not sufficiently tightened up, I provide a spring ring 21 split as at 22, see Fig. 2, and adapted to be seated in an annular groove 23 in the outer end of the tapered portion 14.

In use, with the parts properly positioned and the nut tightened so as to firmly clamp the plug, all danger of the latter becoming loose and lost is obviated. However, should there be lost motion occasioned by wear from repeated removal and replacing of the plug to apply the grease, all that it is necessary to do is to tighten up the nut so as to further compress the split tapered portion, when the plug will be again securely held against becoming loose and lost.

Modifications in details may be resorted to without departing from the spirit of the invention or sacrificing any of its advantages.

What is claimed as new is:—

1. A grease cup plug, retaining means embodying a compressible member adapted to have threaded engagement therewith and with the member carrying the cup and means for compressing said member.

2. A grease cup plug, a bushing having a non-compressible portion adapted to have threaded engagement with said plug and a compressible portion of the bushing also adapted to have threaded engagement with the plug and means for compressing said member.

3. A grease cup plug, a bushing adapted to have threaded engagement with said plug and provided with a tapered compressible portion also adapted to have screw-threaded engagement with the plug and with the member carrying the cup and means for compressing said member.

4. A grease cup plug, a bushing adapted to have threaded engagement with said plug and having a split tapered screw-threaded portion, and a nut engageable with the latter to compress it into threaded engagement with the plug.

5. A grease cup plug, a bushing adapted to have threaded engagement with said plug and having a split tapered screw-threaded portion, and a nut engageable with the latter to compress it into threaded engagement with the plug and tapered to correspond to the taper of the split portion.

6. A grease cup plug, a bushing adapted to have threaded engagement with said plug and having a split tapered screw-threaded portion, a nut engageable with the latter to compress it into threaded engagement with the plug, and means for retaining said nut in position.

7. A grease cup plug, a bushing adapted to have threaded engagement with said plug and having a split tapered screw-threaded portion, a nut engageable with the latter to compress it into threaded engagement with the plug, and means for preventing displacement of the nut.

In testimony whereof I affix my signature.

VINCEN P. McVOY.